US012580495B2

(12) United States Patent
Lee et al.

(10) Patent No.: US 12,580,495 B2
(45) Date of Patent: Mar. 17, 2026

(54) PHASE INVERTER USING TRANSFORMER AND TRANSISTOR SWITCH

(71) Applicant: FOUNDATION OF SOONGSIL UNIVERSITY—INDUSTRY COOPERATION, Seoul (KR)

(72) Inventors: Jaeyong Lee, Seoul (KR); Changkun Park, Gwangmyeong-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 191 days.

(21) Appl. No.: 18/386,241

(22) Filed: Nov. 1, 2023

(65) Prior Publication Data

US 2024/0322709 A1     Sep. 26, 2024

(30) Foreign Application Priority Data

Mar. 20, 2023     (KR) ........................ 10-2023-0035676

(51) Int. Cl.
H02M 7/537        (2006.01)
H02M 1/08        (2006.01)
(52) U.S. Cl.
CPC ............. H02M 7/537 (2013.01); H02M 1/08 (2013.01)
(58) Field of Classification Search
CPC ...... H02M 7/537; H02M 7/525; H02M 7/527; H02M 7/529; H02M 7/538; H02M 7/53803; H02M 7/53806; H02M 1/08; H02M 1/081; H02M 1/06; H02M 1/082; H02M 1/083; H02M 1/084; H02M 1/088
See application file for complete search history.

(56) References Cited

U.S. PATENT DOCUMENTS

| | | | |
|---|---|---|---|
| 9,548,704 B1 | 1/2017 | Ben-Yishay et al. | |
| 2016/0276941 A1* | 9/2016 | Iwaya ................. | H02M 3/3376 |
| 2022/0109363 A1* | 4/2022 | Lin ..................... | H02M 1/0048 |

FOREIGN PATENT DOCUMENTS

| | | |
|---|---|---|
| KR | 10-1983-0004717 A | 7/1983 |
| KR | 10-2022-0112429 A | 8/2022 |

* cited by examiner

*Primary Examiner* — Nguyen Tran
(74) *Attorney, Agent, or Firm* — Revolution IP, PLLC

(57)        ABSTRACT

A phase inverter includes a first transistor connected to a single signal port, a second transistor connected to the single signal port, a third transistor connected to a first power supply and forming a first contact point with the first transistor, a fourth transistor connected to the first power supply and forming a second contact point with the second transistor, and a transformer having a primary side connected to the first and the second contact point, and a secondary side connected to a first and a second differential signal port, wherein the phase inverter operates in one of a first phase mode in which only the first and the fourth transistor are turned on according to levels of voltages applied to gates of transistors, and a second phase mode in which only the second and the third transistor are turned on.

7 Claims, 4 Drawing Sheets

(a) first phase mode (Phase Mode 1)

(b) second phase mode (Phase Mode 2)

PHASE INVERTER USING TRANSFORMER AND TRANSISTOR SWITCH

CROSS-REFERENCE TO RELATED APPLICATION

This application is based on and claims priority under 35 U.S.C. § 119 to Korean Patent Application No. 10-2023-0035676, filed on Mar. 20, 2023, in the Korean Intellectual Property Office, the disclosure of which is incorporated by reference herein in its entirety.

BACKGROUND

The present invention relates to a phase inverter using a transformer and a transistor switch, and more particularly, to a phase inverter using a transformer and a transistor switch that may invert a phase of an output signal by controlling a current direction of an input signal in an opposite direction through switching according to a mode.

As a wireless communication frequency increases, the amount of data transmission also increases, but at the same time, a propagation distance of a signal is reduced due to a high frequency.

A general fifth generation (5G) millimeter wave communication compensates for the disadvantage by using a method of amplifying a signal strength by implementing a multi-channel radio frequency (RF) system using a phase array antenna to concentrate the signal in a specific direction. In this case, since a direction of the signal is controlled through a phase difference of each channel in the RF system, a highly accurate phase converter for this is required. Also, since one single circuit is required for each conversion unit phase, the total area of a system increases.

A transformer theoretically generates differential signals having a phase difference of 180 degrees. Therefore, there is a need for a new type of phase inverter that may enabling a phase inversion of 0 degree and 180 degree by adding a simple circuit to the known transformer and greatly reduce the total area of a system.

The background technology of the present invention is disclosed in Korean Patent Publication No. 10-1983-0004717 (published on Jul. 16, 1983).

SUMMARY

The present invention provides a phase inverter using a transformer and a transistor switch that may invert a phase of an output signal to 0° and 180° according to each phase mode by controlling a current direction of an input signal in an opposite direction according to the phase mode by using switching of the transformer and a transistor symmetrical to each other.

According to an aspect of the present invention, a phase inverter includes a first transistor having a first terminal connected to a single signal port and having a gate to which one of a high-level voltage and a low-level voltage is applied, a second transistor having a first terminal connected to the single signal port and having a gate to which a voltage at a level opposite to a level of a voltage applied to the first transistor is applied, a third transistor having a first terminal connected to a first power supply, a second terminal forming a first contact point with a second terminal of the first transistor, and a gate to which the voltage at the level opposite to the level of the voltage applied to the first transistor is applied, a fourth transistor having a first terminal connected to the first power supply, a second terminal forming a second contact point with a second terminal of the second transistor, and a gate to which a voltage at a level equal to the level of the voltage applied to the first transistor is applied, and a transformer having a first terminal and a second terminal on a primary side respectively connected to the first contact point and the second contact point, and a first terminal and a second terminal on a secondary side respectively connected to a first differential signal port and a second differential signal port, wherein the phase inverter operates in one of a first phase mode in which only the first transistor and the fourth transistor are turned on according to levels of voltages applied to gates of the first, second, third, and fourth transistors, and a second phase mode in which only the second transistor and the third transistor are turned on according to the levels of the voltages applied to the gates of the first, second, third, and fourth transistors.

Also, when a single input signal is input through the single signal port, differential signals of opposite phases may be output through the first and second differential signal ports, and in the first phase mode, the differential signals output through the first and second differential signal ports may have a phase inverted by 180° from the differential signals output in the second phase mode.

Also, in the first phase mode in which only the first and fourth transistors are turned on, a first signal output through the first differential signal port may have the same phase as the input signal, and a second signal output through the second differential signal port may have an opposite phase to the input signal, and in the second phase mode in which only the second and third transistors are turned on, the first signal output through the first differential signal port may have an opposite phase to the input signal, and the second signal output through the second differential signal port may have the same phase as the input signal.

Also, when the differential signals of opposite phases are input through the first and second differential signal ports, a single output signal may be output through the single signal port, and in the first phase mode, the single output signal output from the single signal port may have a phase inverted by 180° from the single output signal output in the second phase mode.

Also, in the first phase mode in which only the first and fourth transistors are turned on, the single output signal output through the single signal port may have the same phase as the first signal input to the first differential signal port, and have an opposite phase to the second signal input to the second differential signal port, and in the second phase mode in which only the second and third transistors are turned on, the single output signal output through the single signal port may have an opposite phase to the first signal input to the first differential signal port, and have the same phase as the second signal input to the second differential signal port.

Also, the phase inverter may further include a controller configured to control a level of a voltage applied each of the gates of the first, second, third, and fourth transistors to drive the phase inverter in one of the first phase mode and the second phase mode.

Also, the first terminals of the first, second, third, and fourth transistors may be source terminals, the second terminals may be drain terminals, and the first power supply may be a ground power supply.

Also, the first, second, third, and fourth transistors may each have a structure in which the first terminal is connected to a body.

Also, the first, second, third, and fourth transistors may each have a structure in which a body is connected to the ground power supply.

Also, the phase inverter may further include at least one fifth transistor connected in series to the third transistor between the second terminal of the third transistor and the first contact point, and at least one sixth transistor connected in series to the fourth transistor between the second terminal of the fourth transistor and the second contact point.

According to the present invention, an input signal may be inverted to 0° and 180° according to a phase mode through a circuit configuration using a transformer and transistors having a symmetric structure. There is an advantage in that the present invention may be applied to and implemented in a circuit using a transformer without affecting the entire size of the circuit. In addition, the present invention may support a highly accurate phase inversion through a symmetric structure and replace a unit circuit for performing a phase conversion of 180° in a phase converter, and accordingly, a size of the entire system using the converter may be reduced.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
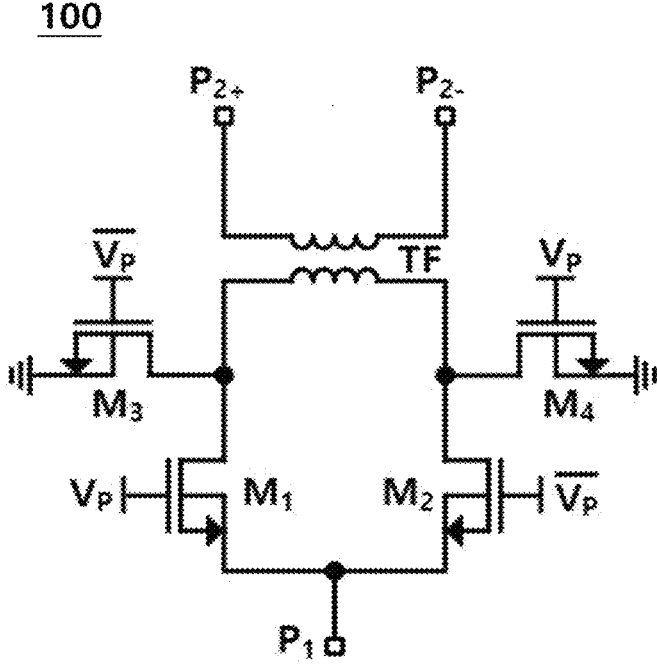
FIG. 1 is a diagram illustrating a configuration of a phase inverter according to an embodiment of the present invention.

Then, embodiments of the present invention will be described in detail with reference to the accompanying drawings such that those skilled in the art to which the present invention belongs may easily practice the embodiments. However, the present invention may be implemented in many different forms and is not limited to the embodiments described herein. In addition, in order to clearly describe the present invention in the drawings, parts irrelevant to the description are omitted, and similar reference numerals are attached to similar parts throughout the specification.

Throughout the specification, when a portion or a unit is described to be "connected" to another portion or another unit, this includes not only a case of being "directly connected", but also a case of being "electrically connected" with other elements therebetween. In addition, "including" a certain component means that other components may be further included, rather than excluding other components unless otherwise stated.

The present invention relates to a phase inverter using a transformer and a transistor switch and proposes a new type of phase inverter that may invert a phase of a signal to 0° and 180° with a simple additional circuit to the known transformer and reduce a system area. The phase inverter according to the present invention capable of replacing the 180° unit circuit that performs 180° phase conversion in the known phase inverter.

FIG. 1 is a diagram illustrating a configuration of a phase inverter according to an embodiment of the present invention.

As illustrated in FIG. 1, a phase inverter 100 according to an embodiment of the present invention includes first, second, third, and fourth transistors M1, M2, M3, and M4 and a transformer TF. The first, second, third, and fourth transistors M1, M2, M3, and M4 of the proposed phase inverter 100 are composed of two pairs and may invert a phase while turning on and off alternately.

The phase inverter 100 according to an embodiment of the present invention includes a signal port $P_1$ and a first differential signal port $P_{2+}$ and a second differential signal port $P_{2-}$. The signal port $P_1$ is connected to the first and second transistor M1 and M2, and the first and second differential signal ports $P_{2+}$ and $P_{2-}$ are connected to the transformer TF.

Here, the signal port $P_1$ is an input/output port for a single signal, and the first and second differential signal ports $P_{2+}$ and $P_{2-}$ are input/output ports for differential signals having phases opposite to each other. When the signal port $P_1$ is an input port, the first and second differential signal ports $P_{2+}$ and $P_{2-}$ operate as output ports, and when the first and second differential signal ports $P_{2+}$ and $P_{2-}$ are input ports, the signal port $P_1$ operates as an output port.

Accordingly, the phase inverter 100 may receive a single input signal through the signal port $P_1$, process the input signal by using the first, second, third, and fourth transistors M1, M2, M3, and M4, and output differential signals through the first and second differential signal ports $P_{2+}$ and $P_{2-}$, and in contrast to this, the phase inverter 100 may receive differential signals through the first and second differential signal ports $P_{2+}$ and $P_{2-}$, process the differential signals by using the transformer TF and the first, second, third, and fourth transistors M1, M2, M3, and M4, and output a single output signal through the signal port $P_1$.

The first, second, third, and fourth transistors M1, M2, M3, and M4 may each be implemented by an n-type metal oxide semiconductor fiend effect transistor (MOSFET) illustrated in FIG. 1, a p-type MOSFET, a bipolar junction transistor (BJT), or other switches depending on circuit configurations. Also, operation performance of a circuit may be supplemented by applying a multi-stage cascode structure to the third and fourth transistors M3 and M4.

First, referring to FIG. 1, a first terminal (for example, a source terminal) of the first transistor M1 is connected to the signal port $P_1$, and a voltage of a high or low level is applied to a gate of the first transistor M1.

In FIG. 1, $V_p$ represents a high-level voltage, and $\overline{V_p}$ represents a low-level voltage. For example, when a high-level voltage is applied to the gate of the first transistor M1, the first transistor M1 may be turned on, and when a low-level voltage is applied to the gate of the first transistor M1, the first transistor M1 may be turned off. Of course, it is also possible to implement a reverse operation.

FIG. 1 illustrates a case in which the high-level voltage $V_p$ is applied to the gate of the first transistor M1 and the first transistor M1 is turned on.

A first terminal (for example, a source terminal) of the second transistor M2 is connected to the signal port $P_1$, and a voltage at a level (for example, a low level) opposite to a level of a voltage applied to the first transistor M1 is applied to a gate of the second transistor M2. FIG. 1 illustrates a case in which the low-level voltage $\overline{V_p}$ is applied to the gate of the second transistor M2 and the second transistor M2 is turned off.

The first transistor M1 and the second transistor M2 have a symmetric structure with respect to the signal port $P_1$.

Next, a first terminal (for example, a source terminal) of the third transistor M3 is connected to a first power supply (for example, GND), a second terminal (for example, a drain terminal) forms a first contact point with a second terminal (for example, a drain terminal) of the first transistor M1, and a voltage at a level (for example, a low level) opposite to a level of a voltage applied to the first transistor M1 is applied to a gate of the third transistor M3. FIG. 1 illustrates a case in which the low-level voltage $\overline{V_p}$ is applied to the gate of the third transistor M3 and the third transistor M3 is turned off.

A first terminal (for example, a source terminal) of the fourth transistor M4 is connected to the first power supply (for example, GND), a second terminal (for example, a drain terminal) forms a second contact point with a second terminal (for example, a drain terminal) of the second transistor M2, and a voltage at a level that is same as the level (for example, a high level) of the first transistor M1 is applied to a gate of the fourth transistor M4. FIG. 1 illustrates a case in which the high-level voltage $V_p$ is applied to the gate of the fourth transistor M4 and the fourth transistor M4 is turned on.

The third transistor M3 and the fourth transistor M4 have a symmetric structure with respect to the signal port $P_1$.

In the embodiment of the present invention, when a high-level voltage is input to the first and fourth transistors M1 and M4, a low-level voltage is input to the second and third transistors M2 and M3 (in relation with a first phase mode), and when a low-level voltage is input to the first and fourth transistors M1 and M4, a high-level voltage is input to the second and third transistors M2 and M3 (in relation with a second phase mode).

The transformer TF includes a primary side and a secondary side. Here, a first terminal on the primary side of the transformer TF is connected to the first contact point (for example, a contact point between drains of the first and third transistors M1 and M3), and a second terminal on the primary side of the transformer TF is connected to the second contact point (for example, a contact point between drains of the second and fourth transistors M2 and M4).

A first terminal on the secondary side of the transformer TF is connected to the first differential signal port $P_{2+}$ and a second terminal on the secondary side of the transformer TF is connected to the second differential signal port $P_{2-}$.

The phase inverter 100 having such a structure may operate as at least one of a first phase mode in which only the first and fourth transistors M1 and M4 are turned on according to the voltages applied to the gates of the first, second, third, and fourth transistors M1, M2, M3, and M4, and a second phase mode in which only the second and third transistors M2 and M3 are turned on.

Here, the phase inverter 100 may further include a controller (not illustrated) that controls and switches phase modes. The controller may control levels of voltages applied to the gates of the first, second, third, and fourth transistors M1, M2, M3, and M4 to drive the phase inverter 100 in one of the first and second phase modes.

Figure 2:
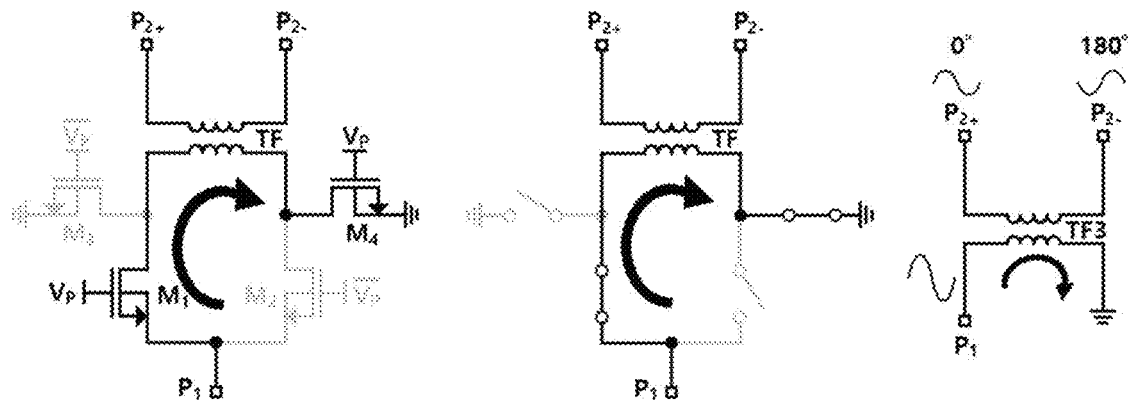
FIG. 2 illustrates diagrams of examples of operations according to a phase mode of the phase inverter illustrated in FIG. 1.
Figure 2:
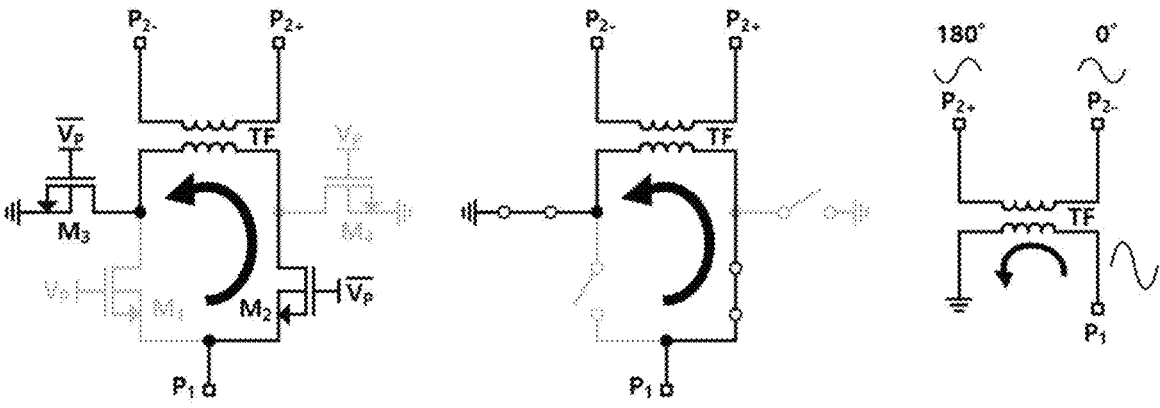

FIG. 2 illustrates diagrams of examples of operations according to a phase mode of the phase inverter illustrated in FIG. 1. (a) of FIG. 2 illustrates an operation of a first phase mode (Phase Mode 1), and (b) of FIG. 2 illustrates an operation of a second phase mode (Phase Mode 2).

(a) and (b) of FIG. 2 each include three figures, and in each case, the leftmost figure illustrates an actual operation circuit, the middle figure illustrates an equivalent circuit thereof, and the right figure illustrates a final equivalent circuit thereof.

In the first phase mode (Phase Mode 1) illustrated in (a) of FIG. 2, only the first and fourth transistors M1 and M4 are turned on, a current flows clockwise, and accordingly, an input signal applied to the signal port $P_1$ is transmitted from the first transistor M1 to the fourth transistor M4. According to this operation, in the rightmost figure, a first signal of the same phase (0°) as the input signal is output through the first differential signal port $P_{2+}$ connected to the transformer TF, and a second signal of an opposite phase (180°) to the input signal is output through the second differential signal port $P_{2-}$. In this case, the first and second signals, which are differential signals, are attenuated more than the input signal while passing through the transformer TF.

In contrast to this, in the second phase mode (Phase Mode 2) illustrated in (b) of FIG. 2, only the second and third transistors M2 and M3 are turned on, a current flows counterclockwise, and accordingly, an input signal applied to the signal port $P_1$ is transmitted from the second transistor M2 to the third transistor M3. According to this operation, in the rightmost figure, a first signal of an opposite phase (180°) to the input signal is output through the first differential signal port $P_{2+}$ connected to the transformer TF, and a second signal of the same phase (0°) as the input signal is output through the second differential signal port $P_{2-}$. In this case, the first and second signals, which are differential signals, are attenuated more than the input signal while passing through the transformer TF.

Here, a signal direction (a current direction) when an input signal applied to the signal port $P_1$ is transmitted from the first transistor M1 to the fourth transistor M4 as in Phase Mode 1 is exactly opposite to a signal direction (a current direction) when the input signal applied to the signal port $P_1$ is transmitted from the second transistor M2 to the third transistor M3 as in Phase Mode 2, and accordingly, phases of the signals output from the first and second differential signal ports $P_{2+}$ and $P_{2-}$ are reversed according to phase modes.

As a result, in a structure of the phase inverter 100 according to the embodiment of the present invention, when a single input signal is input through the signal port $P_1$, differential signals of opposite phases are respectively output through the first and second differential signal ports $P_{2+}$ and $P_{2-}$, and in the first phase mode (Phase Mode 1), it can be seen in the right figures of (a) and (b) of FIG. 2 that each of the differential signals output through the first and second differential signal ports $P_{2+}$ and $P_{2-}$ has a phase completely inverted by 180° from the differential signal output in the second phase mode (Phase Mode 2).

Accordingly, the phase inverter 100 according to the embodiment of the present invention may invert waveforms of signals output through output ports with respect to the same input signal, according to a change in phase mode.

FIG. 2 illustrates that the phase inverter 100 receives a single input signal through the signal port $P_1$ and outputs differential signals through the first and second differential signal ports $P_{2+}$ and $P_{2-}$ (CASE 1: single signal input/ differential signal output).

The phase inverter 100 according to the embodiment of the present invention may perform opposite operations, that is, may receive differential signals through the first and second differential signal ports $P_{2+}$ and $P_{2-}$ and output a single output signal through the signal port $P_1$ (CASE 2: differential signal input/single signal output).

Of course, signal input directions are different from each other in CASE 2, and accordingly, it is obvious that a secondary side of the transformer TF may serve as a primary side of the transformer TF and the primary side may serve as the secondary side in contrast to CASE 1.

Figure 3:
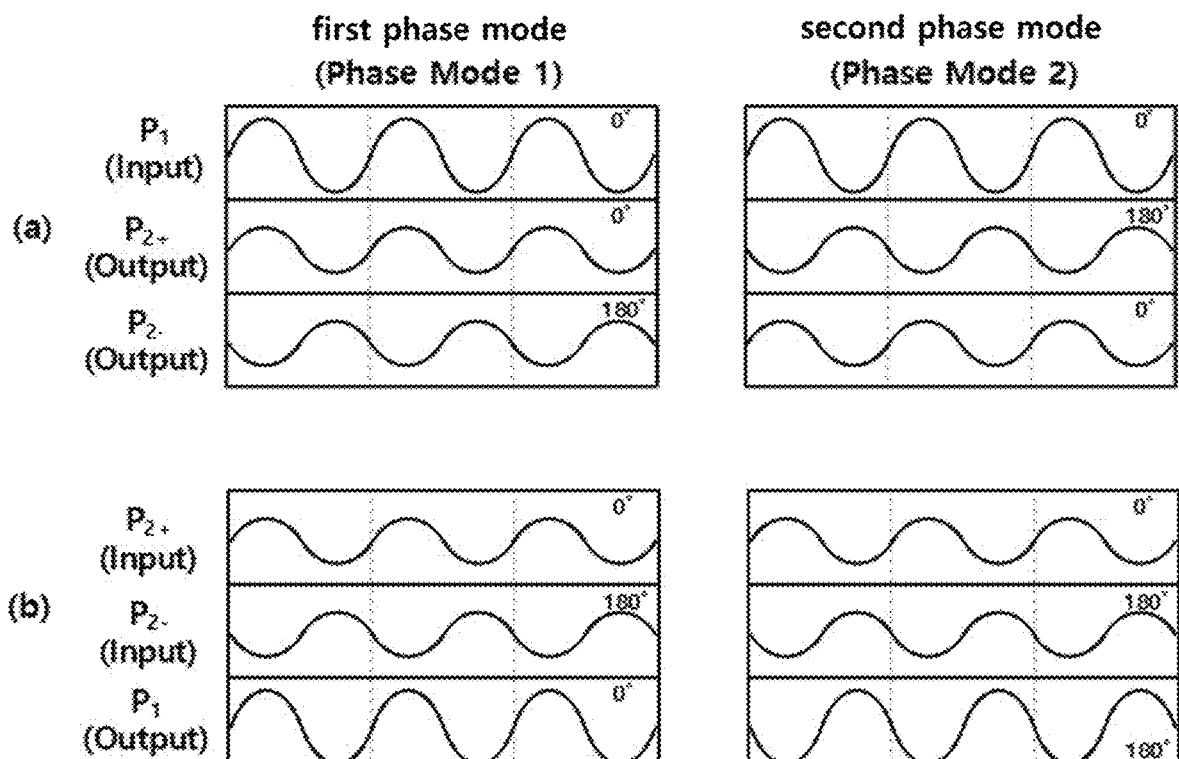
FIG. 3 illustrates diagrams of operation waveforms of the phase inverter illustrated in FIG. 1.

FIG. 3 illustrates diagrams of operation waveforms of the phase inverter illustrated in FIG. 1.

(a) of FIG. 3 illustrates operation waveforms in CASE 1, and (b) of FIG. 3 illustrates operation waveforms in CASE 2.

In addition, each of left figures illustrates operation waveforms in the first phase mode (Phase Mode 1), and each of right figures illustrates operation waveforms in the second phase mode (Phase Mode 2).

First, it can be seen that the operation waveforms for each phase mode of CASE 1 illustrated in (a) of FIG. 3 coincide with signal waveforms for each phase mode illustrated in the right figures of FIG. 2. Therefore, redundant descriptions of CASE 1 are omitted.

Next, referring to the operation waveforms for each phase mode of CASE 2 illustrated in (b) of FIG. 3, in the first phase mode (Phase Mode 1) in which only the first transistor M1 and the fourth transistor M4 are turned on, a single output signal output through the signal port $P_1$ has the same phase as a first signal input to the first differential signal port $P_2+$, and has an opposite phase to a second signal input to the second differential signal port $P_2-$. In this case, a signal is amplified and output while passing through a transistor.

Also, in the second phase mode (Phase Mode 2) in which only the second transistor M2 and the third transistor M3 are turned on, a single output signal output through the signal port $P_1$ has an opposite phase to the first signal input to the first differential signal port $P_{2+}$ and has the same phase as the second signal input to the second differential signal port $P_{2-}$. In this case, a signal is amplified and output while passing through a transistor.

As a result, in a structure of the phase inverter 100 according to the embodiment of the present invention, it can be seen that, when differential signals of opposite phases are input through the first and second differential signal ports $P_{2+}$ and $P_{2-}$, a single output signal is output through the signal port $P_1$, and the single output signal output from the signal port $P_1$ in the first phase mode (Phase Mode 1) has a phase inverted by 180° from the single output signal output in the second phase mode (Phase Mode 2) (see left and right figures of (b) of FIG. 3).

In this way, even in CASE 2, the phase inverter 100 according to the embodiment of the present invention may invert a waveform of a signal output through an output port with respect to the same input signal according to a change in phase mode.

The phase inverter 100 according to the embodiment of the present invention described above theoretically may support complete inversion of 180° through a symmetric structure, be built into a transformer itself, and does not affect the structure of an active circuit of an amplifier or so on, and accordingly, the circuit may operate in the best state.

Also, the phase inverter 100 according to the embodiment of the present invention may be built into a transformer basically required in a circuit of a differential structure, does not require an additional area, and may remove (replace) a unit circuit for performing a phase conversion of 180° in the known phase inverter, and accordingly, a size of the entire system may be effectively reduced.

As described above, according to the present invention, the phase inverter may greatly reduce a phase conversion error of 180° among phases to convert phases and may be configured through a transformer used for the known differential circuit, and accordingly, the entire area of a system may be reduced.

The embodiment of the present invention illustrates that each of the first terminals of the first, second, third, and fourth transistors M1, M2, M3, and M4 is a source terminal and each of the second terminals thereof is a drain terminal. Of course, embodiments of the present invention are not limited thereto. Also, although not illustrated, a second power supply (for example, VDD) higher than the first power supply may be applied to the second terminals (for example, drain terminals) of the first and second transistors M1 and M2.

In the embodiment of the present invention, each of the first, second, third, and fourth transistors M1, M2, M3, and M4 constituting the phase inverter 100 has a structure in which a first terminal is connected to a body. However, the present invention is not limited thereto.

Figure 4:
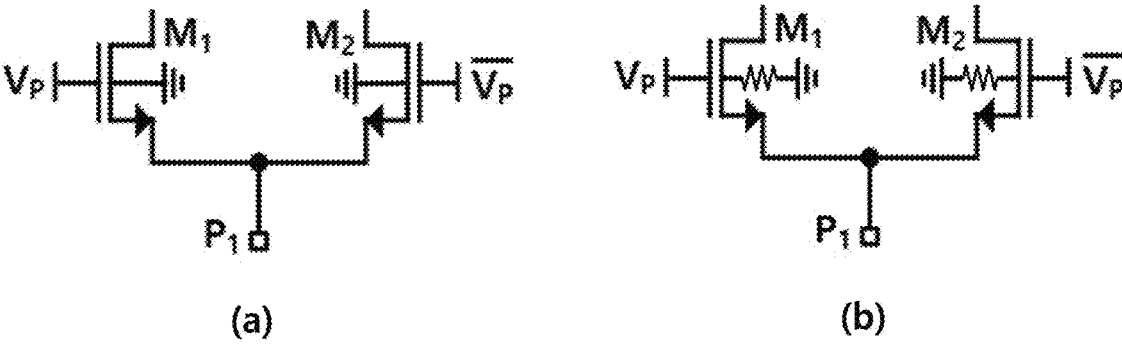
FIG. 4 illustrates diagrams of modification examples of respective transistors included in a phase inverter, according to an embodiment of the present invention.

FIG. 4 illustrates diagrams of modification examples of respective transistors included in a phase inverter, according to embodiments of the present invention. FIG. 4 illustrates only some of all transistors for the sake of convenience of description.

As illustrated in (a) of FIG. 4, first, second, third, and fourth transistors M1, M2, M3, and M4 constituting the phase inverter 100 according to the embodiment of the present invention may each have a modified structure in which each body is connected to a ground power supply, and a resistance element may be added between the body of each transistor and the ground power supply as illustrated in (b) of FIG. 4.

Figure 5:
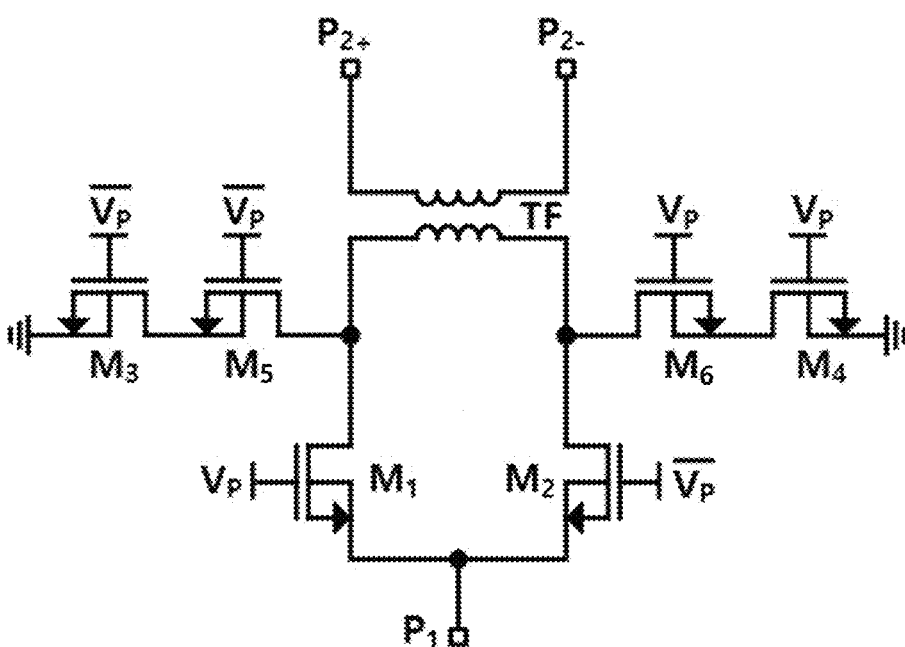
FIG. 5 is a diagram illustrating another embodiment of the phase inverter illustrated in FIG. 1.

FIG. 5 is a diagram illustrating another embodiment of the phase inverter illustrated in FIG. 1.

FIG. 5 is an example in which a fifth transistor M5 and a sixth transistor M6 are added to the structure of FIG. 1. As illustrated in FIG. 5, at least the fifth transistor M5 connected in series (cascode) to the third transistor M3 may be added between a second terminal (for example, a drain terminal) of the third transistor M3 and the first contact point. In addition, at least the sixth transistor M6 connected in series (cascode) to the fourth transistor M4 may be added between a second terminal (for example, a drain terminal) of the fourth transistor M4 and the second contact point. Through this multistage cascode structure, the operation performance of a circuit may be improved.

According to the present invention described above, an input signal may be inverted to 0° and 180° according to a phase mode through a circuit configuration using a transformer and transistors having a symmetric structure. There is an advantage in that the present invention may be applied to and implemented in a circuit using a transformer without affecting the entire size of the circuit.

In addition, the present invention may support a highly accurate phase inversion through a symmetric structure and replace a unit circuit for performing a phase conversion of 180° in a phase converter, and accordingly, a size of the entire system using the converter may be reduced.

Also, the present invention may provide a phase inversion function by designing a small-size phase inverter capable of inverting a phase of an input signal by 180° through a simple circuit configuration.

Although the present invention is described with reference to the embodiments illustrated in the drawings, this is merely an example, and those skilled in the art to which the present invention belongs will understand that various modifications and equivalent other embodiments may be derived therefrom. Therefore, the true technical scope of protection of the present invention should be determined by the technical idea of the appended claims.

What is claimed is:

1. A phase inverter comprising:
a first transistor having a first terminal connected to a single-ended signal port and a gate to which one of a high-level voltage and a low-level voltage is applied;
a second transistor having a first terminal connected to the single-ended signal port and a gate configured to receive a voltage at a level opposite to that applied to the gate of the first transistor;
a third transistor having a first terminal connected to a first power supply, a second terminal forming a first contact point with a second terminal of the first transistor, and a gate to which the voltage at the level opposite to the level of the voltage applied to the first transistor is applied;
a fourth transistor having a first terminal connected to the first power supply, a second terminal forming a second contact point with a second terminal of the second transistor, and a gate to which a voltage at a level equal to the level of the voltage applied to the first transistor is applied; and
a transformer having a primary winding with a first terminal directly connected to the first contact point and a second terminal directly connected to the second contact point, and a secondary winding with a first terminal and a second terminal respectively connected to a first differential signal port and a second differential signal port,
wherein the phase inverter operates in one of a first phase mode in which only the first transistor and the fourth transistor are turned on, and a second phase mode in which only the second transistor and the third transistor are turned on, according to the levels of the voltages applied to the gates of the first, second, third, and fourth transistors,
wherein the first terminals of the first, second, third, and fourth transistors are source terminals, the second terminals are drain terminals, and the first power supply is a ground power supply,
wherein each of the first, second, third, and fourth transistors has a structure in which a body of the transistor is connected to the ground power supply.

2. The phase inverter of claim 1, wherein,
when a single input signal is input through the single-ended signal port, differential signals of opposite phases are output through the first and second differential signal ports; and in the first phase mode, the differential signals output through the first and second differential signal ports have a phase inverted by 180° from the differential signals output in the second phase mode.

3. The phase inverter of claim 2, wherein,
in the first phase mode in which only the first and fourth transistors are turned on, a first signal output through the first differential signal port has the same phase as the input signal, and a second signal output through the second differential signal port has an opposite phase to the input signal, and
in the second phase mode in which only the second and third transistors are turned on, the first signal output through the first differential signal port has an opposite phase to the input signal, and the second signal output through the second differential signal port has the same phase as the input signal.

4. The phase inverter of claim 1, wherein,
when differential signals of opposite phases are input through the first and second differential signal ports, a single output signal is output through the single-ended signal port; and
in the first phase mode, the single output signal output from the single-ended signal port has a phase inverted by 180° from the single output signal output in the second phase mode.

5. The phase inverter of claim 4, wherein,
in the first phase mode in which only the first and fourth transistors are turned on, the single output signal output through the single-ended signal port has the same phase as the first signal input to the first differential signal port and has an opposite phase to the second signal input to the second differential signal port; and
in the second phase mode in which only the second and third transistors are turned on, the single output signal output through the single-ended signal port has an opposite phase to the first signal input to the first differential signal port and has the same phase as the second signal input to the second differential signal port.

6. The phase inverter of claim 1, further comprising:
a controller configured to control a level of a voltage applied to each of the gates of the first, second, third, and fourth transistors to drive the phase inverter in either the first phase mode or the second phase mode.

7. The phase inverter of claim 1, further comprising:
at least one fifth transistor connected in series to the third transistor between the second terminal of the third transistor and the first contact point; and
at least one sixth transistor connected in series to the fourth transistor between the second terminal of the fourth transistor and the second contact point.

* * * * *